(12) United States Patent
Su (10) Patent No.: US 10,318,443 B2
(45) Date of Patent: Jun. 11, 2019

(54) COMPUTER DEVICE AND CONFIGURATION AND MANAGEMENT METHOD OF COMPUTER DEVICE

(71) Applicant: Huawei Technologies Co., Ltd., Shenzhen (CN)

(72) Inventor: Dexian Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/638,043

(22) Filed: Jun. 29, 2017

(65) Prior Publication Data

US 2017/0300431 A1    Oct. 19, 2017

Related U.S. Application Data

(63) Continuation of application No. PCT/CN2015/093593, filed on Nov. 2, 2015.

(30) Foreign Application Priority Data

Dec. 30, 2014  (CN) .......................... 2014 1 0853336

(51) Int. Cl.
*G06F 13/40*  (2006.01)
*G06F 13/10*  (2006.01)
(Continued)

(52) U.S. Cl.
CPC .......... *G06F 13/102* (2013.01); *G06F 9/4401* (2013.01); *H04L 41/00* (2013.01); *H04L 41/02* (2013.01); *H04L 41/08* (2013.01)

(58) Field of Classification Search
None
See application file for complete search history.

(56) References Cited

U.S. PATENT DOCUMENTS 8,189,573 B2    5/2012  Congdon et al.
9,043,527 B2*   5/2015  Bhatia ................. G06F 13/4221
                                                       710/313

(Continued)

FOREIGN PATENT DOCUMENTS

CN    101242371 A    8/2008
CN    102870381 A    1/2013
(Continued)

OTHER PUBLICATIONS

"NVM Express™: Unlock the Potential," Forum A-11, Flash Memory Summit, Santa Clara, California (2014).

*Primary Examiner* — Cheng Yuan Tseng
(74) *Attorney, Agent, or Firm* — Leydig, Voit & Mayer, Ltd.

(57) ABSTRACT

According to the computer device and the configuration and management method of a computer device that are provided in the embodiments of the present invention, an SMM and a CPU are controlled to connect to a PCIE Switch at different stages of system startup, so that management of a PCIE device does not rely on involvement of the CPU of the computer device. In this way, the PCIE device can be configured and managed without involvement of an operating system of the computer device, and CPU resources are saved. Manageability of the computer device is improved, meeting a requirement of a large data center for simplifying computing device management. In addition, the PCIE device is connected to the PCIE Switch by using a downstream port, with no need to configure a special interface to connect to the SMM, thereby simplifying system configuration.

20 Claims, 4 Drawing Sheets

(51) Int. Cl.
  *H04L 12/24* (2006.01)
  *G06F 9/4401* (2018.01)

(56) References Cited

U.S. PATENT DOCUMENTS

| | | | |
|---|---|---|---|
| 9,612,989 B2 * | 4/2017 | Eguchi | ............... G06F 13/36 |
| 2006/0242353 A1 | 10/2006 | Torudbakken et al. | |
| 2010/0281518 A1 | 11/2010 | Bugenhagen | |
| 2012/0179804 A1 | 7/2012 | Katanp et al. | |
| 2014/0052309 A1 | 2/2014 | Chandrasekhar et al. | |
| 2014/0122769 A1 | 5/2014 | Su et al. | |
| 2014/0181354 A1 | 6/2014 | Yi et al. | |

FOREIGN PATENT DOCUMENTS

| | | |
|---|---|---|
| CN | 103023824 A | 4/2013 |
| CN | 103098428 A | 5/2013 |
| CN | 104579772 A | 4/2015 |
| WO | 2010114910 A1 | 10/2010 |

* cited by examiner

COMPUTER DEVICE AND CONFIGURATION AND MANAGEMENT METHOD OF COMPUTER DEVICE

CROSS-REFERENCE TO RELATED APPLICATIONS

This application is a continuation of International Application No. PCT/CN2015/093593, filed on Nov. 2, 2015, which claims priority to Chinese Patent Application No. 201410853336.2, filed on Dec. 30, 2014. The disclosures of the aforementioned applications are hereby incorporated by reference in their entireties.

TECHNICAL FIELD

The present invention relates to the field of information technologies, and in particular, to a computer device and a configuration and management method of a computer device.

BACKGROUND

With the development of a data center and a virtualization technology, reliability of a data network generally depends on a network interface card bonding technology. Network interface card bonding requires a user to understand a network architecture of physical server connections, so that a networking scheme meeting reliability of a data center can be designed. This imposes higher requirements on skills of system maintenance personnel, increases server maintenance difficulty, and increases system maintenance costs. To resolve such a problem, management software of a server is used for management. By using the management software, the user no longer needs to consider network networking reliability, but leaves the network networking reliability to the management software for implementation. This greatly reduces maintenance operation complexity for the user, and reduces service incidents (such as a broadcast storm or a service interruption) resulting from user mis-operations or incorrect network configuration. Simplification of the server use for the user actually means enhanced functions of a network interface card and the management software. Consequently, configuration and management of the management software and the network interface card become more complex.

Regardless of a converged network interface card or a next-generation multi-function network interface card, there is more configuration and management communication between the management software or a user and a network interface card (firmware upgrading, physical function configuration, reliability configuration, virtual machine QoS configuration, VLAN configuration, and the like). Configurability and manageability of the network interface card become an important function of a new-generation server.

Stateless computing becomes a necessary feature of an existing server, so as to implement plug-and-play of server hardware. Peripheral Component Interconnect Express (PCIE) devices such as a network interface card, a converged network adapter (CNA), a redundant array of independent disks (RAID) card, a solid state disk (SSD) card, and a graphics processing unit (GPU) card need to implement a function of hardware replacement with no configuration lost. The configuration mostly exists in a profile form in the management software of the server. When hardware is replaced or new hardware is added, a system management module (SMM) delivers configuration information of all peripheral devices, so as to implement plug-and-play.

In the prior art, the SMM is connected to a server device over a network, and configures and manages a device such as the CNA/RAID/SSD in two manners.

A configuration proxy module is installed on a server system, and the SMM communicates with the configuration proxy module to implement configuration for the device such as the CNA/RAID/SSD.

When the server needs to configure the peripheral device such as the CNA/RAID/SSD, the server loads a simple operating system from the SMM module, starts it, and then starts a service system locally from the server after the configuration is complete.

The manner in which a configuration proxy tool is installed on an OS of the computer device depends on a type and a version of the OS that are selected by a user. As a result, deployment of an upgrade tool is inconvenient and uncontrollable, a firmware version cannot be checked, and a development workload is heavy as a firmware upgrade tool is strongly associated with the type of the OS system. The simple operating system increases a system startup time. In addition, the SMM needs to connect to a server host system by using a network, which increases hardware costs. Management and service are coupled by using a service channel, which is unfavorable for maintenance and isolation.

SUMMARY

Embodiments of the present disclosure provide a computer device and a configuration and management method of a computer device, so as to resolve a prior-art problem that flexibility is poor and system configuration is complex because the computer device needs to rely on an operating system of the computer device to configure and manage a PCIE device.

According to a first aspect, an embodiment of the present disclosure provides a computer device, including a Peripheral Component Interconnect Express (PCIE) Switch, a system management module (SMM), a central processing unit (CPU), and at least one PCIE device, where the SMM and the CPU are respectively connected to the PCIE Switch by using a PCIE port, and the at least one PCIE device is respectively connected to a downstream port of the PCIE Switch by using a PCIE port;

the SMM is connected to the PCIE Switch by using a management channel, and controls a PCIE port connected to the SMM or a PCIE port connected to the CPU to be an upstream port of the PCIE Switch; and the SMM is connected to the PCIE Switch by using a PCIE link, and manages the at least one PCIE device by using the PCIE Switch.

In a first possible implementation manner of the first aspect, the SMM configures the PCIE port between the PCIE Switch and the SMM as the upstream port by using the management channel when the SMM configures and manages the at least one PCIE device by using the PCIE link between the SMM and the PCIE Switch.

In a second possible implementation manner of the first aspect, the SMM configures the PCIE port between the PCIE Switch and the CPU as the upstream port by using the management channel after the SMM configures and manages the at least one PCIE device.

With reference to the first aspect, or the first or the second possible implementation manners of the first aspect, in a third possible implementation manner of the first aspect, the SMM includes a management central processing unit (MCPU), and the MCPU is connected to the PCIE Switch by using the PCIE link and configures and manages the at least one PCIE device.

With reference to the third possible implementation manner of the first aspect, in a fourth possible implementation manner of the first aspect, the PCIE Switch is independent of the CPU or the PCIE Switch is located in the CPU.

With reference to the fourth possible implementation manner of the first aspect, in a fifth possible implementation manner of the first aspect, that the MCPU configures and manages the at least one PCIE device includes at least one of the following: upgrading firmware, configuring a parameter, or querying PCIE device information.

According to a second aspect, an embodiment of the present disclosure further provides a configuration and management method of a computer device, where the computer device includes a Peripheral Component Interconnect Express (PCIE) Switch, a system management module (SMM), a central processing unit (CPU), and at least one PCIE device, and the method includes: configuring, by the SMM, a PCIE port between the PCIE Switch and the SMM as an upstream port by using a management channel;

connecting, by the SMM, to the PCIE Switch by using a PCIE link, and configuring and managing the at least one PCIE device by using the PCIE Switch; and configuring, by the SMM, a PCIE port between the PCIE Switch and the CPU as the upstream port by using the management channel after the SMM completes configuring and managing the at least one PCIE device.

In a first possible implementation manner of the second aspect, the SMM includes a management central processing unit (MCPU), and the MCPU is connected to the PCIE Switch by using the PCIE link and configures and manages the at least one PCIE device.

In a second possible implementation manner of the second aspect, the SMM and the CPU are respectively connected to the PCIE Switch by using the PCIE port, and the at least one PCIE device is respectively connected to a downstream port of the PCIE Switch by using a PCIE port.

With reference to the first or the second possible implementation manners of the second aspect, in a third possible implementation manner of the second aspect, the PCIE Switch is independent of the CPU or the PCIE Switch is located in the CPU.

With reference to the first or the second possible implementation manners of the second aspect, in a fourth possible implementation manner of the second aspect, that the MCPU configures and manages the at least one PCIE device includes at least one of the following: upgrading firmware, configuring a parameter, or querying PCIE device information.

According to the computer device and the configuration and management method of a computer device that are provided in the embodiments of the present disclosure, an SMM and a CPU are controlled to be connected to a PCIE Switch at different stages of system startup, so that when the SMM is connected to the PCIE Switch, the PCIE Switch disconnects from the CPU, and management of a PCIE device does not rely on involvement of the CPU of the computer device. In this way, the PCIE device can be configured and managed without involvement of an operating system of the computer device, and CPU resources are saved. The SMM module implements out-of-band management of the PCIE device, thereby reducing coupling to the computer device, improving manageability of the computer device, and meeting a requirement of a large data center for simplifying computing device management. In addition, the PCIE device is connected to the PCIE Switch by using a downstream port, with no need to configure a special interface to connect to the SMM, thereby simplifying system configuration.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
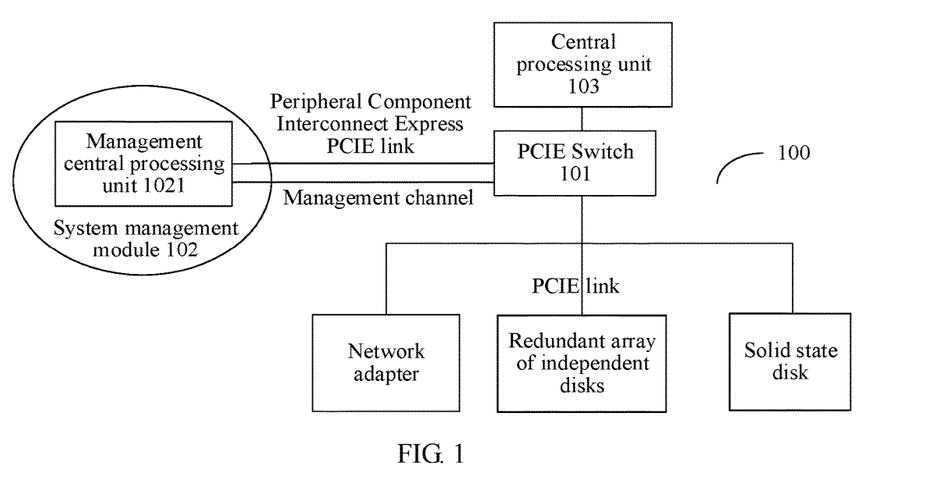
FIG. 1 is a schematic diagram of a specific implementation structure of a PCIE device management system 100 according to an embodiment of the present disclosure.

FIG. 1 is a schematic diagram of a specific implementation structure of a computer device 100 according to an embodiment of the present disclosure. The computer device 100 includes a SMM 102, a PCIE Switch 101, a central processing unit 103 (CPU), and PCIE devices (a CNA, a RAID, and an SSD are used as examples for description). The SMM 102 is configured to manage hardware of the computer device, including power-on and power-off control of the computer device, device ambient temperature control, board voltage monitoring, configuration and management of the PCIE device such as the CNA/RAID/SSD, firmware upgrading, and the like. The SMM 102 is connected to the PCIE Switch 101 of the computer device by using a PCIE port provided by a management central processing unit (MCPU) 1021. The PCIE Switch 101 includes two Up Ports, which are respectively connected to the CPU 103 of the computer device and the MCPU 1021 of the SMM 102. The PCIE Switch 101 has multiple Down Ports, which are respectively connected to the PCIE devices such as the CNA/RAID/SSD. The CPU 103 of the computer device accesses the peripheral devices such as the CNA/RAID/SSD by using the PCIE Switch.

According to a PCIE standard, a PCIE network is in a tree structure. Each PCIE Switch can have only one Up Port and multiple Down Ports at a time. Therefore, for the two Up Ports respectively connected to the CPU 103 of the computer device and the MCPU 1021 of the SMM 102, only one Up Port can work at a time. Different Up Ports are controlled to connect to the PCIE Switch 101 at different stages of system startup, so that the PCIE Switch 101 disconnects from the CPU 103 when the SMM 102 is connected to the PCIE Switch 101. Management of the PCIE devices does not rely on involvement of the CPU 103 of the computer device, thereby saving resources of the CPU 103. Involvement of an operating system of the computer device is not required, thereby implementing effective management of the PCIE devices (such as the CNA/RAID/SSD) by the SMM 102. In addition, the PCIE devices such as the CNA are connected to the PCIE Switch 101 by using a Down Port, with no need to configure a special interface to connect to the SMM 102, thereby simplifying system configuration. The SMM 102 may configure and manage different devices by using different device drivers.

In this embodiment of the present disclosure, the SMM 102 may configure and manage different devices by using different device drivers, including but not limited to a PCIE driver, a device driver, and a device manager. The PCIE driver completes basic device information configuration such as basic PCIE device discovery and address space allocation. The device driver is a dedicated driver of various PCIE devices, and mainly completes peripheral device configuration and management for a device management module. The device management completes parameter configuration of a PCIE device according to configuration template information provided by a user. It should be noted that the computer device needs to be restarted after the SMM 102 completes configuration and management, so as to implement configuration of the PCIE device.

Figure 2:
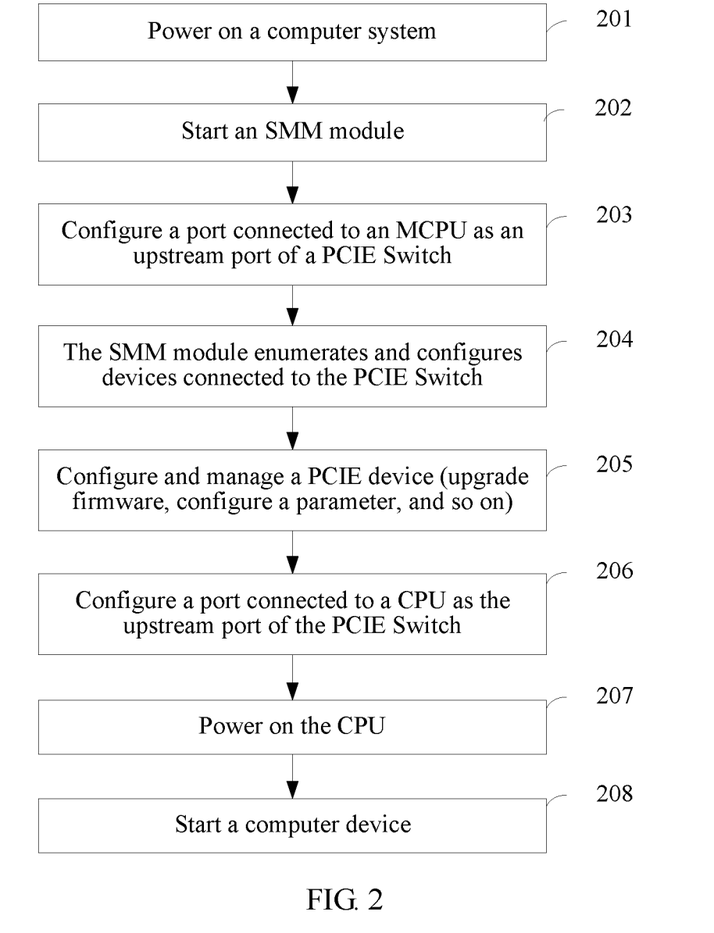
FIG. 2 is a schematic diagram of a procedure of configuring and managing a PCIE device and a startup procedure of using the PCIE device by a CPU according to an embodiment of the present disclosure.

As shown in FIG. 2, a procedure of configuring and managing a PCIE device by the MCPU in the SMM module and a system startup procedure of normally using the PCIE device by the CPU include the following steps:

Step 201. Power on a computer system.

Step 202. Start an SMM.

Step 203. The SMM configures a port connected to an MCPU as an upstream port of a PCIE Switch.

Step 204. The SMM enumerates and configures PCIE devices connected to the PCIE Switch.

For example, a depth-first search algorithm defined in a PCIE standard may be used to progressively discover all PCIE devices mounted to the PCIE Switch. After the PCIE devices are discovered, basic information such as IO space and memory space needs to be configured.

Step 205. The SMM configures and manages the PCIE devices connected to the PCIE Switch.

That the SMM configures and manages the PCIE devices connected to the PCIE Switch includes but is not limited to upgrading firmware, configuring a parameter (such as a quantity of physical functions, a type, bandwidth, and a RAID algorithm), querying PCIE device information, and so on.

Step 206. Configure a PCIE port connected to a CPU as an upstream port of the PCIE Switch.

Specifically, the upstream port may be changed, by using a management channel between the SMM module and the PCIE Switch, for example, an mChannel management channel, to the PCIE port for connecting to the CPU of the computer device. The mChannel management channel in this embodiment of the present disclosure may be an Inter-Integrated Circuit (I2C) channel.

Step 207. When the upstream port of the PCIE Switch is switched to the PCIE port between the PCIE Switch and the CPU, power on the CPU of the computer device.

Step 208. Start the computer device.

The startup of the computer device includes hardware initializing, operating system running, application program running, and the like.

Figure 3:
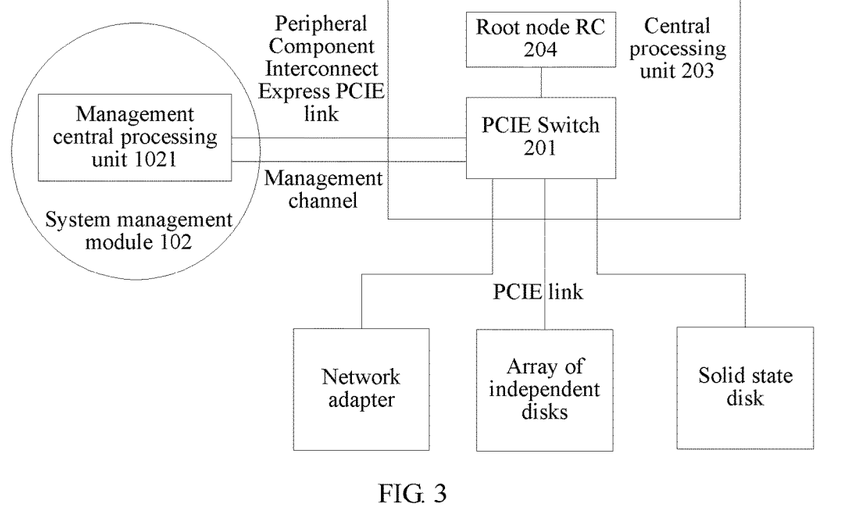
FIG. 3 is a schematic diagram of another specific implementation structure of a computer device according to an embodiment of the present disclosure.

In the implementation manner in FIG. 1, the PCIE Switch and the CPU are independent of each other. The PCIE Switch is located outside the CPU, and the PCIE Switch establishes a connection to the CPU by using the upstream port. In specific implementation, the PCIE Switch may be located in the CPU. The PCIE Switch is used as a unit integrated in the CPU, and the unit is configured to implement functions to be implemented by the PCIE Switch in FIG. 1. As shown in FIG. 3, FIG. 3 is a schematic diagram of another specific implementation structure of a computer device according to an embodiment of the present disclosure. In the specific implementation structure, an MCPU 1021 of an SMM module 102 is connected to a PCIE Switch 201 in a CPU 203 of a computer device by using a PCIE link and a management channel mChannel, and PCIE devices (such as a CNA/RAID/SSD) are directly connected to the CPU 203 of the computer device by using PCIE links. The PCIE Switch 201 is integrated in the CPU 203 of the computer device. The PCIE Switch 201 may be implemented by using a chip capable of completing functions of the PCIE Switch.

In FIG. 3, the PCIE Switch 201 is further connected to an Root Complex (RC) 204 in the CPU 203. The RC 204 is a root node of a PCIE network. The RC 204 in the CPU 203 is connected to a port (which may be configured as an upstream port) of the PCIE Switch 201. The SMM module 102 changes the upstream port of the PCIE Switch 201 by using the mChannel channel, so as to implement connection control over the PCIE Switch 201. That is, the SMM 102 establishes a connection between the MCPU 1021 and the PCIE Switch 201, and configures a PCIE port between the PCIE Switch and the SMM as the upstream port, or configures a PCIE port between the RC 204 and the PCIE Switch 201 as the upstream port. The MCPU 1021 in the SMM 102 is further connected to the PCIE Switch 201 by using the PCIE link, so as to configure and manage the PCIE devices (such as the CNA/RAID/SSD) without relying on an operating system of the computer device or a specially configured channel provided by the PCIE devices.

Figure 4:
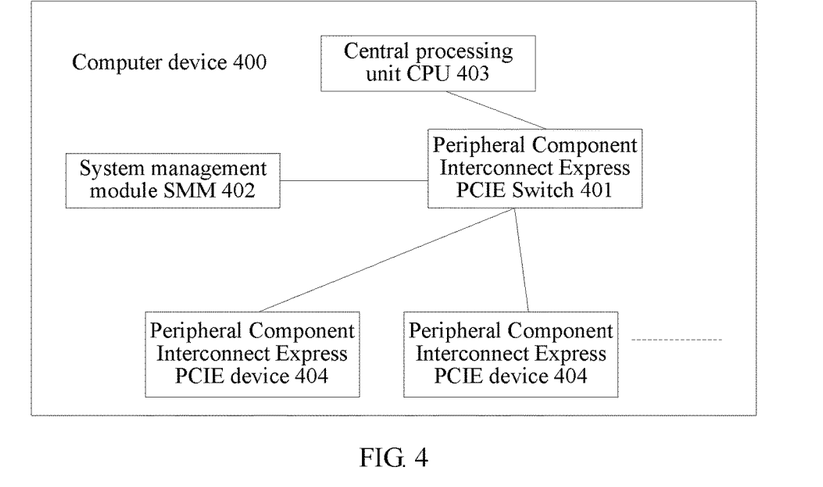
FIG. 4 is a schematic structural diagram of a computer device 400 according to an embodiment of the present disclosure.

Referring to FIG. 4, FIG. 4 is a schematic structural diagram of a computer device 400 according to an embodiment of the present disclosure, including a Peripheral Component Interconnect Express PCIE Switch 401, a system management module SMM 402, a central processing unit CPU 403, and at least one PCIE device 404.

The SMM 402 and the CPU 403 are respectively connected to the PCIE Switch 401 by using PCIE ports. The at least one PCIE device 404 is respectively connected to a downstream port of the PCIE Switch 401 by using a PCIE port.

The SMM 402 is connected to the PCIE Switch 401 by using a management channel, and controls the PCIE port connected to the SMM 402 or the PCIE port connected to the CPU 403 to be an upstream port of the PCIE Switch 401.

The SMM 402 is connected to the PCIE Switch 401 by using a PCIE link, and manages the at least one PCIE device 404 by using the PCIE Switch 401.

In the computer device 400, the PCIE Switch 401 disconnects from the CPU 403 when the SMM 402 is connected to the PCIE Switch 401, so that management of a PCIE device does not rely on involvement of the CPU of the computer device. In this way, the PCIE device can be configured and managed without involvement of an operating system of the computer device, and CPU resources are saved. The SMM module implements out-of-band management of the PCIE device, thereby reducing coupling to the computer device, improving manageability of the computer device, and meeting a requirement of a large data center for simplifying computing device management. In addition, the PCIE device is connected to the PCIE Switch by using a downstream port, with no need to configure a special interface to connect to the SMM, thereby simplifying system configuration.

In an optional implementation manner, in this embodiment of the present disclosure, when the SMM 402 configures and manages the at least one PCIE device 404 by using the PCIE link between the SMM 402 and the PCIE Switch 401, the SMM 402 configures the PCIE port between the PCIE Switch 401 and the SMM 402 as the upstream port by using the management channel.

Further, after the SMM 402 configures and manages the at least one PCIE device 404, the SMM 402 configures the PCIE port between the PCIE Switch 401 and the CPU 403 as the upstream port by using the management channel.

In specific implementation, the SMM 402 may further include a management central processing unit MCPU, and the MCPU is connected to the PCIE Switch 401 by using the PCIE link and configures and manages the at least one PCIE device 404.

Optionally, the PCIE Switch 401 may be located in the CPU, and is used as a module or a unit of the CPU 403, as shown in FIG. 3.

In this embodiment, that the SMM 402 or the MCPU configures and manages the at least one PCIE device 404 includes at least one of the following: upgrading firmware, configuring a parameter, or querying PCIE device information.

Figure 5:
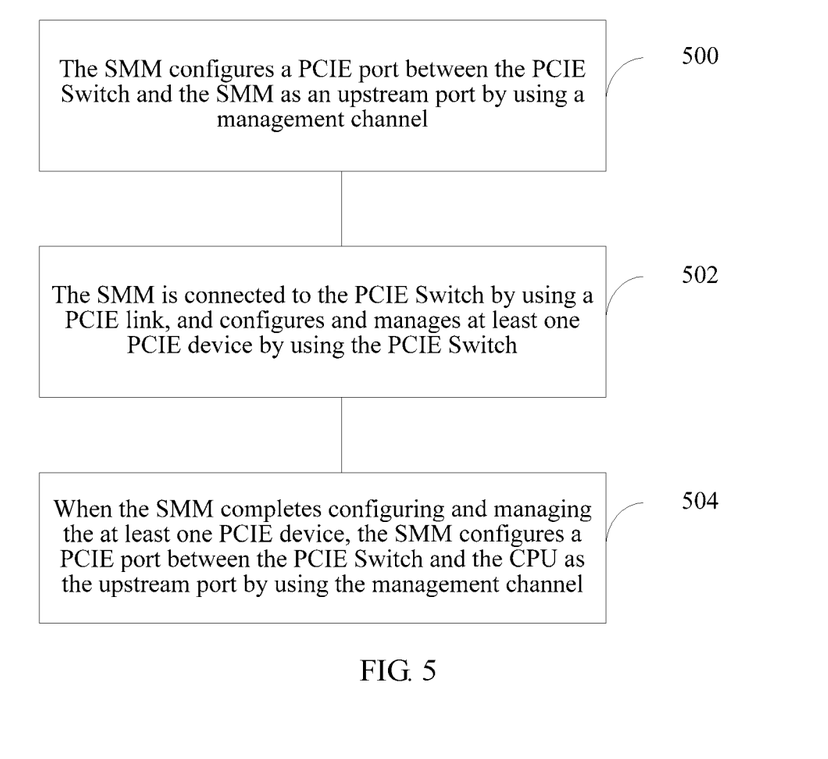
FIG. 5 is a schematic flowchart of a configuration and management method of a computer device according to an embodiment of the present disclosure.

Referring to FIG. 5, FIG. 5 is a schematic flowchart of a configuration and management method of a computer device according to an embodiment of the present disclosure. The computer device includes a Peripheral Component Interconnect Express PCIE Switch, a system management module SMM, a central processing unit CPU, and at least one PCIE device. The method includes the following steps:

Step 500. The SMM configures a PCIE port between the PCIE Switch and the SMM as an upstream port by using a management channel.

Step 502. The SMM is connected to the PCIE Switch by using a PCIE link, and configures and manages the at least one PCIE device by using the PCIE Switch.

Step 504. When the SMM completes configuring and managing the at least one PCIE device, the SMM configures a PCIE port between the PCIE Switch and the CPU as the upstream port by using the management channel.

According to the foregoing method, a connection between an SMM and a PCIE Switch and a connection between a CPU and the PCIE Switch are controlled at different stages of system startup, so that when the SMM is connected to the PCIE Switch, the PCIE Switch disconnects from the CPU, and management of a PCIE device does not rely on involvement of the CPU of a computer device. In this way, the PCIE device can be configured and managed without involvement of an operating system of the computer device, and CPU resources are saved. The SMM module implements out-of-band management of the PCIE device, thereby reducing coupling to the computer device, improving manageability of the computer device, and meeting a requirement of a large data center for simplifying computing device management. In addition, the PCIE device is connected to the PCIE Switch by using a downstream port, with no need to configure a special interface to connect to the SMM, thereby simplifying system configuration.

In specific implementation, the SMM may include a management central processing unit MCPU, and the MCPU is connected to the PCIE Switch by using the PCIE link and configures and manages the at least one PCIE device. That the MCPU configures and manages the at least one PCIE device includes at least one of the following: upgrading firmware, configuring a parameter, or querying PCIE device information.

Optionally, in this embodiment of the present disclosure, the SMM and the CPU are respectively connected to the PCIE Switch by using the PCIE port, and the at least one PCIE device is respectively connected to a downstream port of the PCIE Switch by using a PCIE port.

In specific implementation, the PCIE Switch may be independent of the CPU or the PCIE Switch is located in the CPU.

For the implementation of the foregoing method embodiment, reference may be made to implementation manners of the embodiments in FIG. 1 to FIG. 3, and details are not described again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer device, comprising a Peripheral Component Interconnect Express (PCIE) Switch, a system management module (SMM), a central processing unit (CPU), and at least one PCIE device, wherein:
   the SMM is connected to the PCIE Switch via a first PCIE port and the CPU is connected to the PCIE Switch via a second PCIE port, and the at least one PCIE device is respectively connected to a downstream port of the PCIE Switch via a third PCIE port;
   the SMM is connected to the PCIE Switch via a management channel, wherein the SMM configures the first PCIE port connected to the SMM as an upstream port of the PCIE Switch via the management channel;
   when the SMM configures the first PCIE port connected to the SMM as the upstream port of the PCIE Switch, the SMM is connected to the PCIE Switch by using a PCIE link, and manages the at least one PCIE device by using the PCIE Switch; and
   the SMM configures the second PCIE port between the PCIE Switch and the CPU as the upstream port by using the management channel after the SMM configures and manages the at least one PCIE device.

2. The computer device according to claim 1, wherein the SMM configures the first PCIE port between the PCIE Switch and the SMM as the upstream port by using the management channel when the SMM configures and manages the at least one PCIE device by using the PCIE link between the SMM and the PCIE Switch.

3. The computer device according to claim 1, wherein the SMM comprises a management central processing unit (MCPU), and the MCPU is connected to the PCIE Switch by using the PCIE link and configures and manages the at least one PCIE device.

4. The computer device according to claim 2, wherein the SMM comprises a management central processing unit (MCPU), and the MCPU is connected to the PCIE Switch by using the PCIE link and configures and manages the at least one PCIE device.

5. The computer device according to claim 1, wherein the SMM comprises a management central processing unit (MCPU), and the MCPU is connected to the PCIE Switch by using the PCIE link and configures and manages the at least one PCIE device.

6. The computer device according to claim 3, wherein the PCIE Switch is independent of the CPU.

7. The computer device according to claim 4, wherein the PCIE Switch is located in the CPU.

8. The computer device according to claim 5, wherein the PCIE Switch is independent of the CPU.

9. The computer device according to claim 6, wherein that the MCPU configures and manages the at least one PCIE device comprises at least one of the following: upgrading firmware, configuring a parameter, or querying PCIE device information.

10. A configuration and management method of a computer device, wherein the computer device comprises a Peripheral Component Interconnect Express (PCIE) Switch, a system management module (SMM), a central processing unit (CPU), and at least one PCIE device, comprising:
    configuring, by the SMM, a first PCIE port between the PCIE Switch and the SMM as an upstream port by using a management channel;
    connecting, by the SMM, to the PCIE Switch by using a PCIE link, and configuring and managing the at least one PCIE device by using the PCIE Switch; and
    configuring, by the SMM, a second PCIE port between the PCIE Switch and the CPU as the upstream port by using the management channel after the SMM completes configuring and managing the at least one PCIE device.

11. The method according to claim 10, wherein the SMM comprises a management central processing unit (MCPU), and the MCPU is connected to the PCIE Switch by using the PCIE link and configures and manages the at least one PCIE device.

12. The method according to claim 10, wherein the SMM and the CPU are respectively connected to the PCIE Switch by using the first PCIE port and the second PCIE port, and the at least one PCIE device is respectively connected to a downstream port of the PCIE Switch via a third PCIE port.

13. The method according to claim 11, wherein the SMM and the CPU are respectively connected to the PCIE Switch by using the first PCIE port and the second PCIE port, and the at least one PCIE device is respectively connected to a downstream port of the PCIE Switch via a third PCIE port.

14. The method according to claim 10, wherein the PCIE Switch is independent of the CPU.

15. The method according to claim 10, wherein the PCIE Switch is located in the CPU.

16. The method according to claim 11, wherein the PCIE Switch is independent of the CPU.

17. The method according to claim 11, wherein the PCIE Switch is located in the CPU.

18. The method according to claim 10, wherein
that the MCPU configures and manages the at least one PCIE device comprises at least one of the following: upgrading firmware, configuring a parameter, or querying PCIE device information.

19. The method according to claim 11, wherein
that the MCPU configures and manages the at least one PCIE device comprises at least one of the following: upgrading firmware, configuring a parameter, or querying PCIE device information.

20. A computer device, comprising a Peripheral Component Interconnect Express (PCIE) Switch, a system management module (SMM), a central processing unit (CPU), and at least one PCIE device, wherein:

the SMM is connected to the PCIE Switch via a first PCIE port and the CPU is connected to the PCIE Switch via a second PCIE port, and the at least one PCIE device is respectively connected to a downstream port of the PCIE Switch via a third PCIE port;

the SMM is connected to the PCIE Switch via a management channel, wherein the SMM configures the first PCIE port connected to the SMM as an upstream port of the PCIE Switch via the management channel;

when the SMM configures the first PCIE port connected to the SMM as the upstream port of the PCIE Switch, the SMM is connected to the PCIE Switch by using a PCIE link, and manages the at least one PCIE device by using the PCIE Switch; and the SMM configures the second PCIE port between the PCIE Switch and the CPU as the upstream port by using the management channel independently from when the SMM configures and manages the at least one PCIE device.

* * * * *